United States Patent
Matsuda (10) Patent No.: US 8,960,355 B2
(45) Date of Patent: Feb. 24, 2015

(54) ELECTRIC MOTORCYCLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/993,651

(22) PCT Filed: Dec. 24, 2010

(86) PCT No.: PCT/JP2010/007515
§ 371 (c)(1),
(2), (4) Date: Jun. 28, 2013

(87) PCT Pub. No.: WO2012/085986
PCT Pub. Date: Jun. 28, 2012

(65) Prior Publication Data
US 2013/0270025 A1    Oct. 17, 2013

(51) Int. Cl.
  B62K 11/00    (2006.01)
  B62K 11/04    (2006.01)
  B62M 7/04     (2006.01)
  (Continued)

(52) U.S. Cl.
  CPC .............. B62K 11/00 (2013.01); B62K 11/04 (2013.01); *B62K 2204/00* (2013.01); *B62K 2208/00* (2013.01); B62M 7/04 (2013.01); B60L 11/1879 (2013.01); B60L 15/00 (2013.01);
  (Continued)

(58) Field of Classification Search
  CPC ............ B60K 1/00; B60K 1/04; H02K 7/006; B62K 11/00; B62K 11/04; B62K 2204/00; B62K 2208/00; B62M 7/04; B60L 11/1879; B60L 15/00; B60L 2200/00; B60L 2210/00; Y02T 10/7005; Y02T 10/705

USPC ........ 180/65.1, 219, 220, 291, 292, 293, 295, 180/297, 299, 300
  See application file for complete search history.

(56) References Cited

U.S. PATENT DOCUMENTS

| 7,210,550 B2 * | 5/2007 | Yonehana et al. | 180/220 |
| 2008/0078603 A1 * | 4/2008 | Taji et al. | 180/312 |

FOREIGN PATENT DOCUMENTS

| EP | 1454787 A2 | 9/2004 |
| JP | 05105161 A | 4/1993 |

(Continued)

OTHER PUBLICATIONS

ISA Japan, International Search Report of PCT/JP2010/007515, Apr. 5, 2011, WIPO, 1 page.
European Patent Office, Extended European Search Report of EP10861067, Germany, Apr. 24, 2014, 6 pages.

*Primary Examiner* — Joseph Rocca
*Assistant Examiner* — Jacob Knutson
(74) *Attorney, Agent, or Firm* — Aleman Hall McCoy Russell & Tuttle LLP (57) ABSTRACT

An electric motorcycle of the present invention comprises: a battery for storing electric power; an inverter for generating an AC current by the electric power supplied from the battery to the inverter; a motor for generating driving power by the AC current generated by the inverter and supplied to the motor; a wiring member for electrically connecting the inverter to the motor and flowing a current to drive the motor; a battery case for accommodating the battery; an inverter case for accommodating the inverter; and a motor unit case for accommodating the motor, wherein the wiring member is placed in a space defined by the battery case, the inverter case and the motor unit case.

9 Claims, 7 Drawing Sheets

(51) Int. Cl.
  *B60L 11/18* (2006.01)
  *B60L 15/00* (2006.01)

(52) U.S. Cl.
  CPC .......... *B60L 2200/12* (2013.01); *B60L 2210/00* (2013.01); *Y02T 10/7005* (2013.01); *Y02T 10/705* (2013.01)
  USPC .......................... 180/220; 180/300; 180/295

(56) References Cited

FOREIGN PATENT DOCUMENTS

| | | |
|---|---|---|
| JP | 2004274879 A | 9/2004 |
| JP | 2010100124 A | 5/2010 |
| JP | 2012100397 A | 5/2012 |

\* cited by examiner

ELECTRIC MOTORCYCLE

TECHNICAL FIELD

The present invention relates to an electric motorcycle including a motor which generates driving power by an AC current supplied to the motor.

BACKGROUND ART

In recent years, for the purpose of environmental protection, etc., an electric motorcycle incorporating as a driving power source a motor driven by an electric energy stored in a battery has been developed. Typically, the motor of the electric motorcycle is configured to generate driving power by an AC current supplied to the motor. To this end, the electric motorcycle includes an inverter which generates the AC current by electric power supplied from the battery for storing the electric power to the inverter and supplied to the motor (see e.g., Patent Literature 1). The motor is configured to operate by the AC current generated by the inverter.

CITATION LIST

Patent Literature

Patent Literature 1: Japanese Laid-Open Patent Application Publication No. 2004-274879

SUMMARY OF THE INVENTION

Technical Problem

High-voltage electricity for driving the motor flows through a wiring member electrically connecting the inverter and the motor to each other. For this reason, the electric motorcycle is required to be designed so that a user cannot easily access the wiring member. If the wiring member is disconnected, there may be a possibility that the motor becomes unable to operate and hence the electric motorcycle becomes unable to drive. Therefore, the electric motor is required to be designed so that the wiring member is protected.

Accordingly, an object of the present invention is to provide an electric motorcycle in which the user cannot easily access the wiring member and the wiring member can be protected effectively.

Solution to Problem

An electric motorcycle of the present invention comprises: a battery for storing electric power; an inverter for generating an AC current by the electric power supplied from the battery to the inverter; a motor for generating driving power by the AC current generated by the inverter and supplied to the motor; a wiring member for electrically connecting the inverter to the motor and flowing a current to drive the motor; a battery case for accommodating the battery; an inverter case for accommodating the inverter; and a motor unit case for accommodating the motor, wherein the wiring member is placed in a space defined by the battery case, the inverter case and the motor unit case.

In accordance with this configuration, since the wiring member is placed in the space defined by the battery case, the inverter case, and the motor unit case, it becomes possible to suitably prevent the wiring member from being exposed to outside. This makes it difficult for the user to access the wiring member. In addition, the wiring member can be protected by the three cases.

The battery case may have a corner portion defined by a first wall portion and a second wall portion, and the corner portion may be placed within a recessed portion formed above the motor unit case, the first wall portion may face a first facing portion of the outer surface of the motor unit case, the outer surface defining the recessed portion, and the second wall portion may face a second facing portion of the motor unit case, the second facing portion defining the recessed portion, and the space may be defined by the first wall portion, the first facing portion and the inverter case.

In accordance with this configuration, since the corner portion of the battery case is placed in the recessed portion defined by the motor unit case, the motor unit case and the battery case can be placed compactly. Since the first wall portion defining the corner portion is placed to face the first facing portion of the outer surface defining the recessed portion, and the space in which the wiring member is placed is defined by the first wall portion and the first facing portion, this space can be made easily and to have a narrow dimension.

The battery case may be placed between a front wheel and a rear wheel, the corner portion of the battery case may be provided at a lower end portion of a rear portion of the battery case, the motor unit case may accommodate the motor having a motor shaft and a reduction mechanism which receives a rotational power of the motor shaft from an input shaft, reduces a speed of the rotational power of the motor shaft, and outputs the rotational power from an output shaft, the output shaft may be placed rearward relative to the corner portion, the motor shaft may be placed forward and below relative to the output shaft and forward relative to the corner portion, the first facing portion may be provided between the motor shaft and the first wall portion, and the second facing portion may be provided between the output shaft and the second wall portion.

In accordance with this configuration, since the motor shaft is placed below and forward relative to the output shaft, the motor can be placed to be relatively lower, and a center-of-gravity of the vehicle can be lowered. With the layout of the shafts, the recessed portion which is recessed substantially downward and rearward is formed in the upper surface of the motor unit case, and a portion of the batteries is accommodated in the recessed portion. Thus, the above stated space can be formed while achieving space saving.

The wiring member may extend from the inverter to the motor through a space outside of the battery case, the inverter case and the motor unit case, and through a space between the first wall portion of the battery case and the first facing portion.

In accordance with this configuration, since the wiring member extends outside of the cases, it becomes possible to effectively suppress an increase in temperature of the wiring member. In addition, since the wiring member extends through the narrow space which is closed by the wall portions and the facing portions, outside of the cases, the user cannot easily access the wiring member, and the wiring member can be protected effectively.

The electric motor may comprise: a head pipe; and a main frame extending substantially rearward from the head pipe, the battery case may be mounted to the main frame to extend along a direction in which the main frame extends, and the motor unit case may have a coupling portion for coupling the motor unit case to a rear end portion of the main frame, and the coupling portion may be provided on the second facing portion.

In accordance with this configuration, since the motor unit case serves as the vehicle body frame, the overall vehicle body can be reduced in size. Since the coupling portion is provided in the vicinity of the outer surface defining the recessed portion, the corner portion of the battery case on the main frame can be suitably accommodated into the recessed portion.

A terminal connected to the wiring member may be attached on an outer surface of the motor unit case which defines the space, and the terminal may be provided on an inner portion of the motor unit case in a vehicle width direction.

In accordance with this configuration, since the terminal is placed in the space in which the wiring member is placed, a structure which makes it difficult for the user to access the wiring member and the terminal can be realized. That is, a structure which makes it difficult for the user to access the wiring member and the terminal from outward of the motor unit case in the vehicle width direction can be realized.

The inverter case may be mounted to a lower surface of the battery case and placed forward relative to the motor unit case.

In accordance with this configuration, the wiring member can be protected by the inverter case from forward. Since ram air contacts the inverter case, a heat generating element inside of the inverter can be cooled. Since interference between the wiring member and the reduction mechanism can be prevented, the wiring member extending between the motor and the inverter can be reduced in length.

The motor unit case may be placed rearward relative to the battery case, the inverter case may be placed forward relative to the motor unit case and below the battery case, and the space may be covered with at least one of the motor unit case, the battery case and the inverter case when the space is viewed from front of the inverter case and from rear of the motor unit case.

In accordance with this configuration, a structure which makes it difficult for the user to access the wiring member from forward and from rearward can be realized.

The inverter case may be placed above the motor unit case and rearward relative to the battery case.

In accordance with this configuration, the inverter case can be protected by the battery case and the motor unit case.

The above and further objects, features and advantages of the present invention will more fully be apparent from the following detailed description of preferred embodiments with accompanying drawings.

Advantageous Effects of the Invention

In accordance with the present invention, it is possible to provide an electric motorcycle which makes it difficult for a user to access a wiring member and makes it possible to effectively protect the wiring member.

DESCRIPTION OF THE EMBODIMENTS

Hereinafter, an embodiment of the present invention will be described with reference to the drawings. The stated directions are from the perspective of a driver straddling an electric motorcycle. Throughout the drawings, the same or corresponding components are identified by the same reference symbols, and will not be described in repetition.

Figure 1:
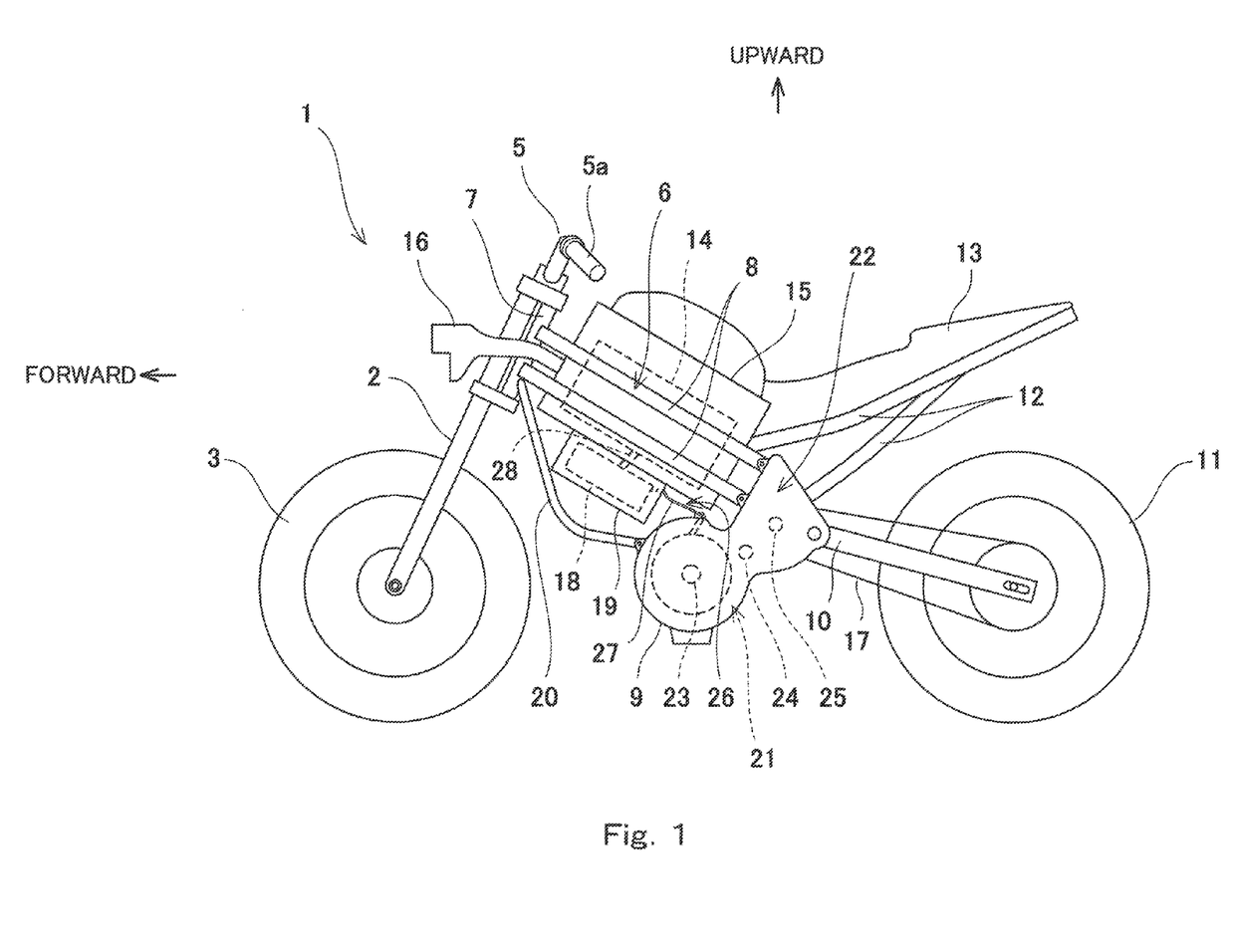
FIG. 1 is a left side view of an electric motorcycle according to an embodiment of the present invention.

FIG. 1 is a left side view of an electric motorcycle 1 according to the embodiment of the present embodiment. As shown in FIG. 1, the electric motorcycle 1 includes a front fork 2 extending substantially vertically with a predetermined caster angle, and a front wheel 3, which is a driven wheel, is rotatably mounted to a lower portion of the front fork 2. A lower portion of a steering shaft (not shown) is coupled to an upper portion of the front fork 2. A bar-type handle 5 is attached to an upper portion of the steering shaft. An accelerator grip 5a is attached on a portion of the handle 5 which is gripped by the driver's right hand. The steering shaft is rotatably inserted into the head pipe 7 defining a vehicle body frame 6. The front wheel 3 is steered by the driver's operation for rotating the handle 5.

The vehicle body frame 6 includes the head pipe 7, and a pair of right and left and a pair of upper and lower main frame members 8 extending rearward from the head pipe 7 such that they are inclined slightly downward. Rear portions of the main frame members 8 are coupled to a motor unit case 9. A front portion of a swing arm 10 extending substantially in a forward and rearward direction is mounted to the motor unit case 9 such that the swing arm 10 is pivotable around the front end portion. A rear wheel 11 which is a drive wheel is rotatably mounted to a rear portion of the swing arm 10. A seat frame member 12 is coupled to the main frame members 8 and to the motor unit case 9 to support a seat 13 which can be straddled by the driver, and the like.

A battery case 15 for accommodating a plurality of batteries 14 for storing electric power is placed between the pair of right and left main frame members 8. The battery case 15 is fastened to the main frame members 8. The battery case 15 is placed such that it overlaps with the main frame members 8 when viewed from side. The main frame members 8 are located in a center portion of the battery case 15 in its height direction when viewed from side. An introduction duct 16 is provided in a location forward relative to the battery case 15 and in the vicinity of the head pipe 7 to take in ram air from forward and guide the ram air to inside of the battery case 15. A rear end of the introduction duct 16 is coupled to an upper portion of a front portion of the battery case 15. The battery case 15 is attached with an inverter case 19 for accommodating the inverter 18. The inverter 18 generates an AC current by the electric power supplied from the batteries 14 to the inverter 18.

The vehicle body frame 6 includes down frame members 20 extending from the head pipe 7, along a space below the battery case 15 such that the down frame members 20 are inclined to be lower than the main frame members 8. Rear portions of the down frame members 20 are coupled to the motor unit case 9. The motor unit case 9 includes an electric motor 21 and a reduction mechanism 22 mounted to a rear portion of the electric motor 21. The electric motor 21 generates driving power by the AC current generated by the inverter and supplied to the electric motor 21. The electric motor 21 has a motor shaft 23. The electric motor 21 generates driving power and thereby the motor shaft 23 rotates. The reduction mechanism 22 includes an input shaft 24 to which a rotation of the motor shaft 23 is input, and an output shaft 25 to which a rotational power of the input shaft 24, a speed of which has been reduced, is transmitted. The reduction mechanism 22 reduces the rotational power of the motor shaft 23 and outputs the rotational power through the output shaft 25. The rotational power output from the output shaft 25 is transmitted to the rear wheel 11 via a chain 17. A shape of the vehicle body frame 6 is not particularly limited. The vehicle body frame 6 may have a twin tube shape or a back bone shape. The reduction mechanism 22 may have a transmission function.

The battery case 15, the inverter case 19 and the motor unit case 9 are placed adjacently to each other. A wiring member 27 is placed in a narrow space 26 defined (surrounded) by the three cases 9, 15, and 19. The wiring member 27 electrically connects the inverter 18 to the electric motor 21. A high-voltage current for driving the electric motor 21 flows through the wiring member 27. Since the wiring member 27 is placed in the space 26 defined by the three cases 9, 15, and 19, it is possible to suitably prevent the wiring member 27 from being exposed to outside. Therefore, the user cannot easily access the wiring member 27. In addition, the wiring member 27 can be protected by the three cases 9, 15 and 19. A wiring member 28 connecting the batteries 14 to the inverter 18 is placed inside of the inverter case 19 and inside of the battery case 15 and is not exposed to outside. Therefore, the user cannot easily access the wiring member 28. In addition, the wiring member 28 can be protected effectively by these cases.

Figure 2:
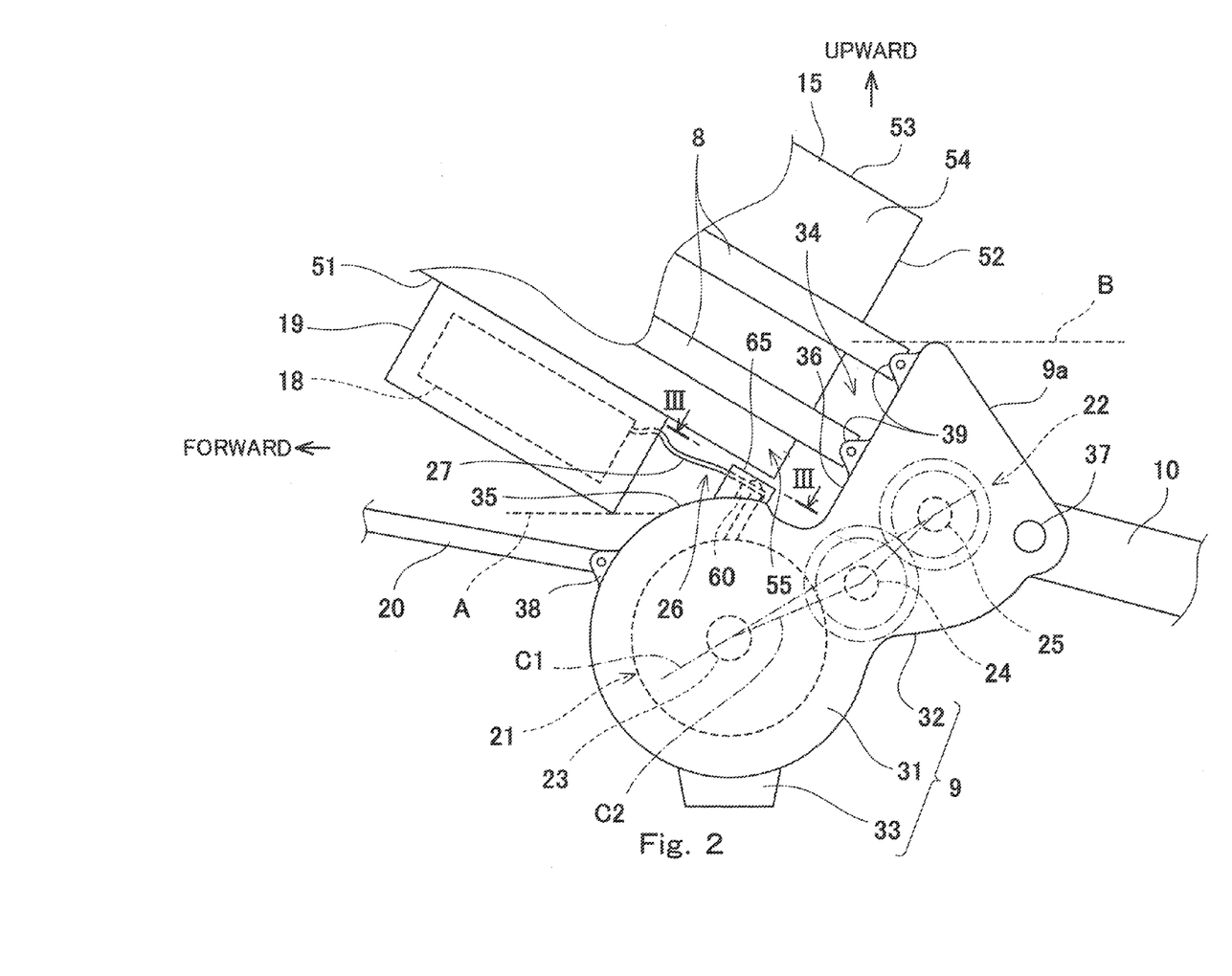
FIG. 2 is an enlarged view of major components of FIG. 1.

FIG. 2 is a partially enlarged view of FIG. 1. As shown in FIG. 2, the inverter case 19 is mounted to a lower surface of the battery case 15, and placed below the battery case 15 and forward relative to the motor unit case 9. An outer rear surface of the inverter case 9 extends downward from a rear portion of the lower surface of the battery case 15. The motor unit case 9 is placed rearward relative to the battery case 15. When the cases 9, 15 and 19 are viewed from forward, a region above a line A horizontally passing through a lowest point of the inverter case 19, in the space 26 defined by the three cases 9, 15 and 19, is covered with the inverter case 19 and the battery case 15 and therefore is invisible. When the three cases 9, 15 and 19 are viewed from rearward, a region below a line B horizontally passing through a highest point of the motor unit case 9, in the space 26 defined by the three cases 9, 15 and 19, is covered with the motor unit case 9 and therefore is invisible. Thus, the space 26 defined by the three cases 9, 15 and 19 includes the closed region which is invisible from forward and from rearward.

The wiring member 27 is placed in the region closed as described above, in the space 26. Specifically, the wiring member 27 extends from an outer rear surface of the inverter case 19, i.e., to be precise, a portion of the outer surface located forward relative to the lowest point of the inverter case 19 and above the lowest point of the inverter case 19. The wiring member 27 extends to a portion of the outer surface of the motor unit case 9, which portion is located above the lowest point of the inverter case 19, forward relative to the highest point of the motor unit case 9, and below the highest point of the motor unit case 9. Since the wiring member 27 is placed in the closed region as described above, the user can-not easily access the wiring member 27 from forward and from rearward, and the wiring member 27 can be protected by the three cases 9, 15 and 19 from forward and from rearward.

To define the closed region as described above, the inverter case 19 is placed forward relative to the motor unit case 9 such that the inverter case 19 covers a space formed between the battery case and the motor unit case 9 from forward. Thereby, the inverter case 19 receives the ram air from forward. As a result, a heat generating element which is a constituent of the inverter 18 can be suitably cooled. The lower surface of the battery case 15 is inclined downward in a direction from forward to rearward. The inverter case 19 protrudes downward from the lower surface of the battery case 15. Therefore, the ram air from forward can be guided to the inverter case 19 along the lower surface of the battery case 15, which can improve an efficiency with which the inverter case 19 is air-cooled. Note that the layout in which the battery case 15 is placed such that it is inclined downward is merely exemplary, and the lower surface of the battery case 15 may be oriented horizontally.

The battery case 15 is placed to cover the motor unit case 9 and the inverter case 19 when viewed from above. Because of this, when the three cases 9, 15, and 19 are viewed from above, the space 26 defined by the three cases 9, 15 and 19 is invisible. Therefore, the wiring member 27 can be protected from above by the battery case 15. For example, it is possible to suitably prevent the wiring member 27 from getting wet by rain water.

The wiring member 27 is protected by the three cases 9, 15 and 19 as described above, and is placed to pass through a space outside of the three cases 9, 15 and 19, from the inverter 18 to the motor 21. This layout allows the wiring member 27 to be exposed to the outside air, which can suitably suppress an increase in a temperature of the wiring member 27.

Hereinafter, a structure of the battery case 15, a structure of the motor unit case 9 and the layout of the wiring member 27 will be described in detail. The battery case 15 has a rectangular parallelepiped shape, and has a lower wall portion 51, a rear wall portion 52, an upper wall portion 53 and side wall portions 54. The lower wall portion 51 and the rear wall portion 52 form a right angle. A corner portion 55 defined by the lower wall portion 51 and the rear wall portion 52 is formed in a rear lower end portion of the battery case 15. The corner portion 55 is the lowest point of the battery case 15. Alternatively, the corner portion 55 may be chamfered to draw a circular-arc shape.

The motor unit case 9 includes a motor accommodating section 31 for accommodating the electric motor 21, a reduction mechanism accommodating section 32 for accommodating the reduction mechanism 22, and an oil pan 33 which stores lubricating oil or cooling oil. The oil pan 33 is located below the motor accommodating section 31. The motor accommodating section 31 has a substantially circular shape when viewed from side. The reduction mechanism accommodating section 32 protrudes obliquely upward in a rearward direction from a rear portion of the motor accommodating section 31. The above stated highest point of the motor unit case 9 is located at a front upper end portion of the reduction mechanism accommodating section 32. The motor accommodating section 31 faces the outer rear surface of the inverter case 19. Therefore, a portion of the outer surface of the motor unit case 9, which portion is located rearward relative to the lowest point of the inverter case 19 and above the lowest point of the inverter case 19 when viewed from front, and located forward relative to the highest point of the motor unit case 9 and below the highest point of the motor unit case 9 when viewed from rear, define the above stated closed region of the space 26. Roughly, this portion is defined by an outer upper surface of the motor accommodating section 31, and an outer front surface of the reduction mechanism accommodating section 32. The outer upper surface of the motor accommodating section 31 has a circular-arc shape which protrudes upward when viewed from side. The outer front surface of the reduction mechanism accommodating section 32 has a linear shape extending upward in a rearward direction when viewed from side. Since a rear portion of the outer upper surface of the motor accommodating section 31 is continuous with a lower portion of the outer front surface of the reduction mechanism accommodating section 32, the outer upper surface of the motor accommodating section 31 and the outer front surface of the reduction mechanism accommodating section 32 form a substantially-V-shape as a whole when viewed from side.

In this structure, a recessed portion 34 having a substantially-V-shape when viewed from side is formed above the motor unit case 9. Inside of the motor unit case 9, the motor shaft 23, the input shaft 24 and the output shaft 25 are arranged in this order from below. The input shaft 24 is placed rearward relative to a line C1 directly connecting the motor shaft 23 to the output shaft 25 when viewed from side (i.e., away from the battery case 15). Therefore, when viewed from side, a line C2 connecting the motor shaft 23 to the output shaft 25 by way of the input shaft 24 is bent in V-shape as in the outer upper surface of the motor accommodating section 31 and the outer front surface of the reduction mechanism accommodating section 32. With this layout of the shafts, the electric motor 21 and the reduction mechanism 22 can be accommodated unitarily into the monitor unit case 9 such that the recessed portion 34 is formed.

The reduction mechanism accommodating section 32 is provided on a rear portion thereof with a pivot portion 37 by which a front end portion of the swing arm 10 is coupled to the rear portion of the reduction mechanism accommodating section 32 such that the swing arm 10 is pivotable. The motor accommodating section 31 is provided on a front portion thereof with a coupling portion 38 by which the rear portion of the down frame member 20 is coupled to the front portion of the motor accommodating section 31. The reduction mechanism accommodating section 32 is provided on the outer front surface thereof with coupling portions 39 by which the outer front surface of the reduction mechanism accommodating section 32 is coupled to the pair of upper and lower main frame members 8 such that the coupling portions 39 are vertically apart from each other. Since the motor unit case 9 serves as a portion of the vehicle body frame 6, i.e., a conventional pivot frame, a vehicle body frame structure can be reduced in size and simplified, as compared to a case where the motor unit case 9 is mounted to the vehicle body frame 6.

In a state in which the rear end portions of the main frame members 8 are coupled to the coupling portions 39, respectively, the corner portion 55 formed in the rear lower end portion of the battery case 15 placed along a direction in which the main frame members 8 extend, can be placed within the recessed portion 34. The lower wall portion 51 of the battery case 15 is placed to face the outer upper surface of the reduction mechanism accommodating section 32, while the rear wall portion 52 of the battery case 15 is placed to face the outer front surface of the motor accommodating section 31. Since the corner portion 55 is formed to have the substantially right angle and the recessed portion 34 has the substantially-V-shape when viewed from side so as to conform in shape to the corner portion 55, the lower wall portion 51 can be suitably placed in close proximity to the outer upper surface of the reduction mechanism accommodating section 32, and the rear wall portion 52 can be placed substantially in parallel with and suitably in close proximity to the outer front surface of the motor accommodating section 31.

The output shaft 25 is placed rearward relative to the corner portion 55, while the motor shaft 23 is placed forward relative to the output shaft 25, below the output shaft 25, and forward relative to the corner portion 55. In other words, since the corner portion 55 is placed inside of the recessed portion 34, the corner portion 55 can be positioned rearward relative to the motor shaft 23 accommodated into the motor unit case 9. Thus, by utilizing the recessed portion 34, an overall dimension of the battery case 15 and the motor unit case 9 in the forward and rearward direction can be made compact. In addition, since the motor shaft 23 can be placed below the corner portion 55 defining the lowest point of the battery case 15, the motor 21 can be placed in a relatively lower position. This makes it possible to lower a center of gravity of the vehicle.

Hereinafter, a portion of the outer wall surface of the motor unit case 9, which portion faces the lower wall portion 51, and is located between the motor shaft 23 and the lower wall portion 51, will be referred to as "first facing portion 35", while a portion of the outer wall surface of the motor unit case 9, which portion faces the rear wall portion 52, and is located between the output shaft 25 and the rear wall portion 52, will be referred to as "second facing portion 36". The above stated coupling portions 39 are provided on the second facing portion 36, and thereby can achieve the above described advantages. The first facing portion 35 of the present embodiment is an upper wall of the motor accommodating section 31, while the second facing portion 36 of the present embodiment is a front wall of the reduction mechanism accommodating section 32.

The region closed as described above, in the space 26 defined by the three cases 9, 15 and 19, is defined by the lower wall portion 51 and the rear wall portion 52 forming the right angle between them, the first facing portion 35 and the second facing portion 36 forming the substantially-V-shape when viewed from side such that the first facing portion 35 and the second facing portion 36 face in close proximity to the lower wall portion 51 and the rear wall portion 52, respectively. Therefore, this region can be narrowed, and can be made to be bent in a V-shape, which is a complicated shape. This makes it more difficult for the user to access the wiring member 27 placed in this region. The space which is narrow and has a complicated shape can be realized by an easy method in which the corner portion 55 of the battery case 15 is placed within the recessed portion 34.

In the vicinity of the lower end portion of the battery case 15, more specifically, the rear lower end portion of the battery case 15, the inverter case 19 and the motor unit case 9 are arranged side by side. In the present embodiment, the inverter case 19 and the motor unit case 9 are arranged in the forward and rearward direction or in the vertical direction, i.e., along the wall surface of the battery case 15. Therefore, the wiring member 27 can be placed so as to extend from the outer rear surface of the inverter case 19 along the lower wall portion 51. Then, the wiring member 27 extends through a space between the lower wall portion 51 and the first facing portion 35, and extends from terminal blocks 60 provided on the first facing portion 51 of the motor unit case 9 into the motor unit case 9. Thus, the wiring member 27 extends outside of the cases in such a way that it extends through the narrow space formed between the lower wall portion 51 and the first facing portion 35 which face each other and in close proximity to each other. This makes it more difficult for the user to access the wiring member 27. In addition, the wiring member 27 can be protected more effectively. Since the terminal blocks 60 are provided on the first facing portion 35 which is a forward side where the inverter case 19 is disposed, of the first facing portion 35 and the second facing portion 36, a length of the wiring member 27 can be reduced. The first facing portion 35 is the outer surface of the motor accommodating section 31, while the second facing portion 36 is the outer surface of the reduction mechanism accommodating section 32. Since the motor accommodating section 31 is disposed at the forward side, interference between the wiring member 27 and the reduction mechanism 22 can be avoided.

Figure 3:
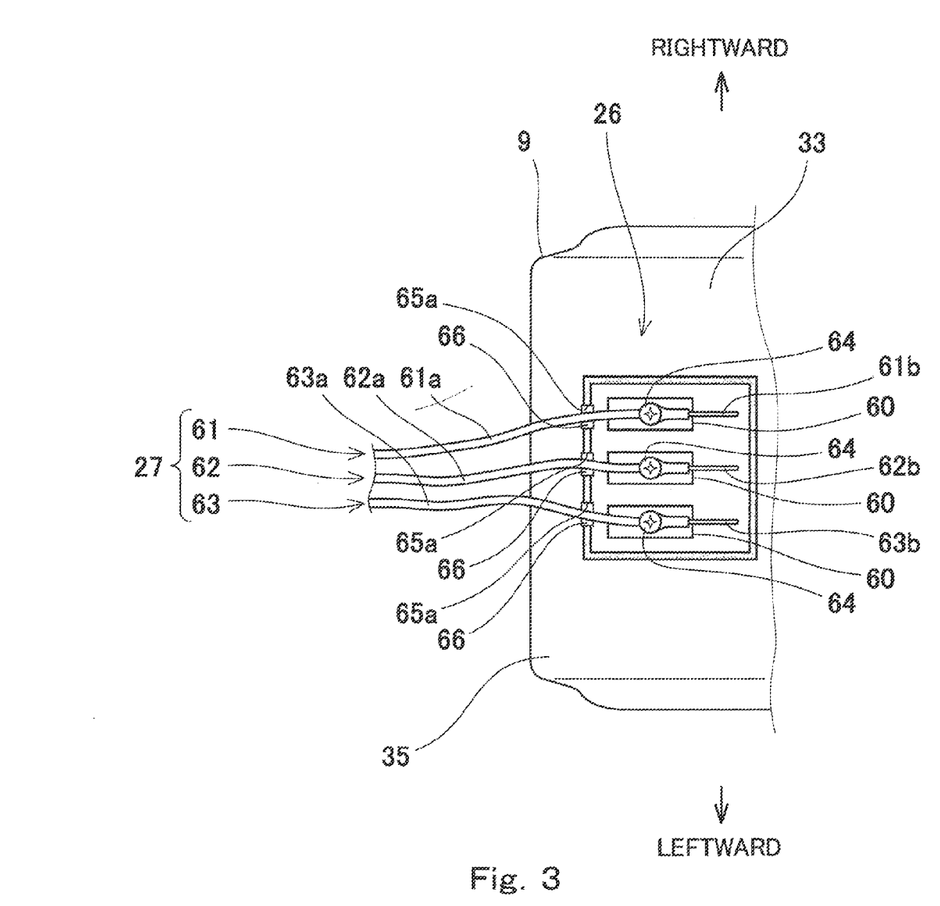
FIG. 3 is a view taken in the direction of arrows along III-III of FIG. 2.

FIG. 3 is a view taken in the direction of arrows along III-III of FIG. 2. As shown in FIG. 3, the terminal blocks 60 are provided in an inner portion of the motor unit case 9, specifically, at a center portion in the vehicle width direction. To supply three-phase AC power of U-phase, V-phase and W-phase, the wiring member 27 has a U-phase wire 61, a V-phase wire 62 and a W-phase wire 63. The U-phase wire 61 includes a first U-phase wire 61a extending from the outer rear surface of the inverter case 19 (see FIG. 2), and a second U-phase wire 61b extending from the first facing portion of the motor unit case 9 into the motor accommodating section 31. The first U-phase wire 61a and the second U-phase line 61b are electrically connected to each other at the corresponding terminal block 60. Thus, the terminal blocks 60 are connecting portions electrically connected to the wiring member. In the terminal blocks 60, the phase-wires 61 to 63 are collectively provided. Likewise, the V-phase wire 62 has a first V-phase wire 62a and a second V-phase wire 62b. Likewise, the W-phase wire 63 has a first W-phase wire 63a and a second W-phase wire 63b. In the present embodiment, the wiring member 27 is electrically connected to the connecting portions of the terminal blocks 60 in such a manner that the wiring member 27 is pressingly fastened to the connecting portions of the terminal blocks 60 via screw members 64. Alternatively, the wiring member 27 may be electrically connected to the connecting portions of the terminal blocks 60 in such a manner that wiring member connecting portions provided at an end portion of the wiring member 27 are fittingly joined to terminal block connecting portions provided at the terminal blocks 60.

The terminal blocks 60 are provided with a box-like member 65 which surround the connecting portions at which the wires 61a, 62a and 63a of the inverter case 19 side are connected to the corresponding wires 61b, 62b and 63b of the motor unit case 9 side, respectively. The box-like member 65 has holes 65a through which the wires 61a, 62a and 63a of the inverter case 19 side are inserted, respectively. Inside of the holes 65a, displacement inhibiting members 66, for example, grommets, are placed to inhibit the wires 61a, 62a and 63a of the inverter case 19 side from being displaced inside of the box-like member 65, respectively.

Since the box-like member 65 is provided to surround the terminal blocks 60 from laterally, it becomes possible to prevent the terminal blocks 60 from contacting the battery case 15 (see FIG. 3) and prevent the terminal blocks 60 from being accessed from outward in the vehicle width direction. Instead of the box-like member 65, protruding portions protruding upward from the motor unit case 9 may be provided at both sides of the terminal blocks 60 in the vehicle width direction. The protruding portions also make it possible to prevent the terminal blocks 60 from contacting the battery case and the terminal blocks 60 from being accessed.

In a case where the box-like member 65 or the battery case 15 is provided to close the terminal blocks 60 from above as well as to surround the terminal blocks 60 from laterally, it becomes possible to prevent rain water from entering the terminal blocks 60. The terminal blocks 60 are positioned above the lowest end portion of the V-shaped space 26 defined by the wall surface of the motor accommodating section 31 and the wall surface of the reduction mechanism accommodating section 32 (see FIG. 3). Because of this, even in a case where the rain water stays in the space 26, it becomes possible to prevent this water from entering the terminal blocks 60.

Since the terminal blocks 60 are placed in the narrow space defined by the first facing portion 35 and the lower wall portion 51 and in the inner portion of the first facing portion 35 in the vehicle width direction, to be precise, center portion in the vehicle width direction, it becomes possible to make it difficult for the user to access the wiring member 27 and the terminal blocks 60 from outside and left of the motor unit case 9 or from outside and right of the motor unit case 9.

Figure 4:
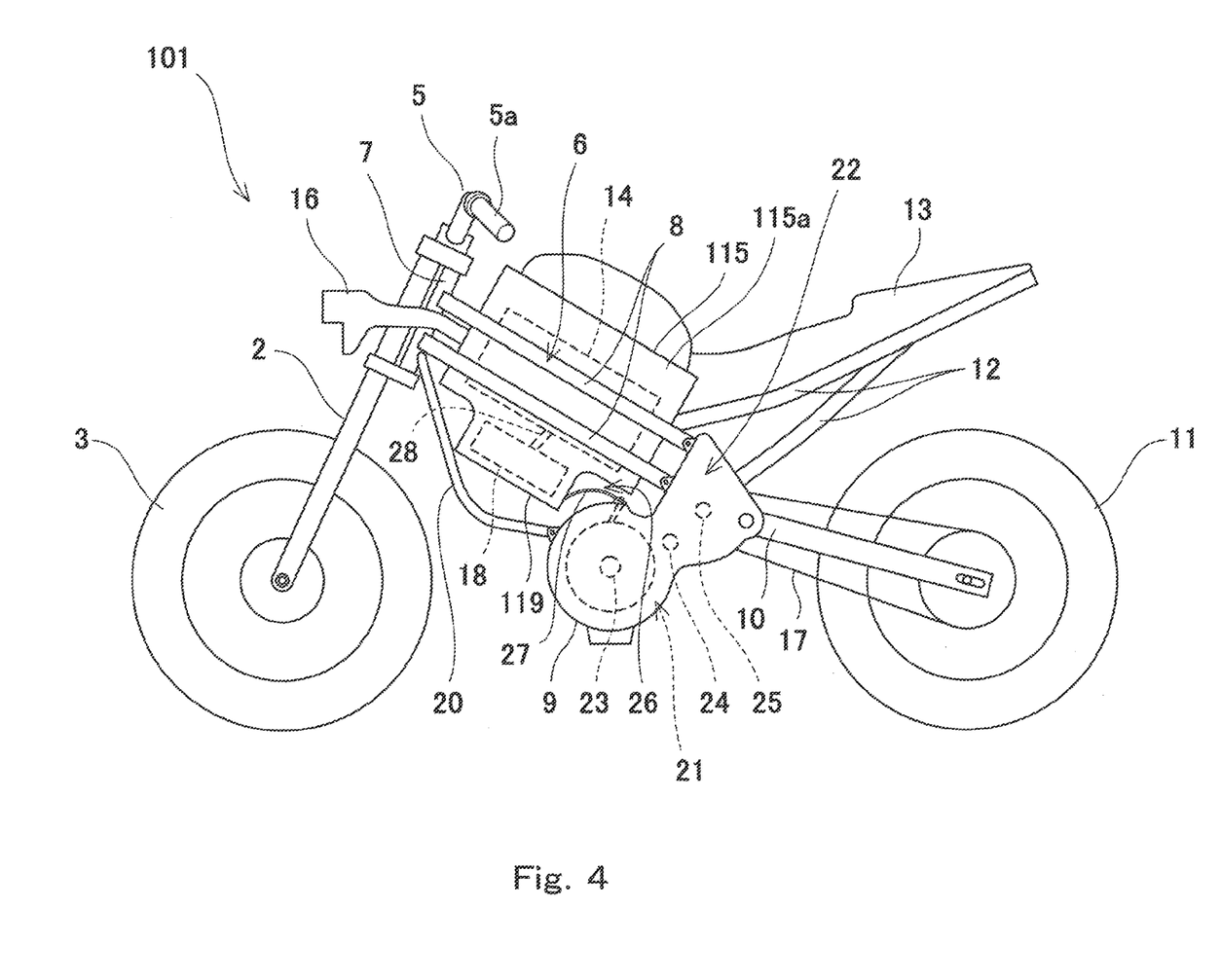
FIG. 4 is a left side view showing an electric motorcycle according to Modified example 1 of the embodiment of the present invention.

FIG. 4 is a left side view showing an electric motorcycle 101 according to Modified example 1 of the embodiment of the present invention. As shown in FIG. 4, in Modified example 1, a battery case 115 includes a body portion 115a for accommodating batteries, and a swelling portion 119 which swells from an underside of the body portion 115a. The inverter 18 is accommodated into the swelling portion 119. Thus, the inverter case may be provided integrally with the battery case. Even in a case where the inverter 18 is accommodated into the battery case 115, the wiring member 27 extends from the inverter case 19 to the terminal blocks 60 of the motor unit case 9 through a space between the motor unit case 9 and the battery case 115. Therefore, the advantages as those described in the above embodiment can be achieved.

Figure 5:
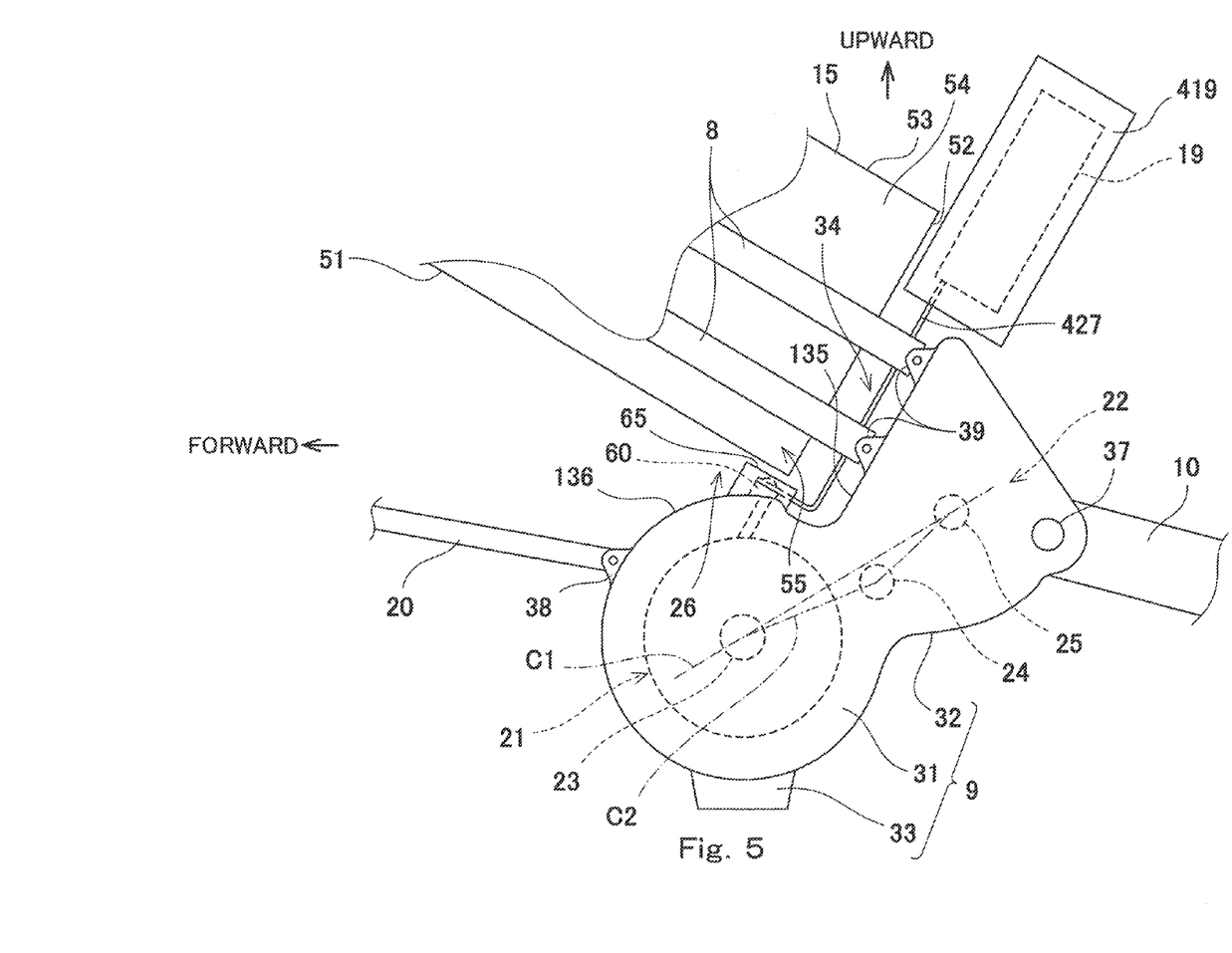
FIG. 5 is a left side view showing a region surrounding a motor unit case according to Modified example 2 of the embodiment of the present invention.

FIG. 5 is a left side view showing a region surrounding a motor unit case according to Modified example 2 of the embodiment of the present invention. As shown in FIG. 5, in Modified example 2, an inverter case 419 is placed above the motor unit case 9 and rearward relative to the battery case 15. The inverter case 419 is placed to close a space formed between the battery case 15 and the motor unit case 9 from above. The inverter case 419 may be fastened to constituents of the vehicle body frame such as the main frame members 8 and the seat frame 12 or to the battery case 15. A wiring member 427 extends from the outer surface (lower surface in the illustrated example) of the inverter case 419, through a space formed between the outer rear surface of the battery case 15 and the outer front surface of the reduction mechanism accommodating section 32, and is coupled to the terminal blocks 60 provided on the front upper surface of the motor accommodating section 31. In Modified example 2, the outer front surface of the reduction mechanism accommodating section 32, of the outer surface of the motor unit case 9, serves as a first facing portion 135, while the outer upper surface of the motor accommodating section 31, of the outer surface of the motor unit case 9, serves as a second facing portion 136. In this case, the wiring member 427 extends from the inverter case 419 to the terminal blocks 60 of the motor unit case 9 through the space formed between the motor unit case 9 and the battery case 15. Therefore, the advantages as those described in the above embodiment can be achieved.

Figure 6:
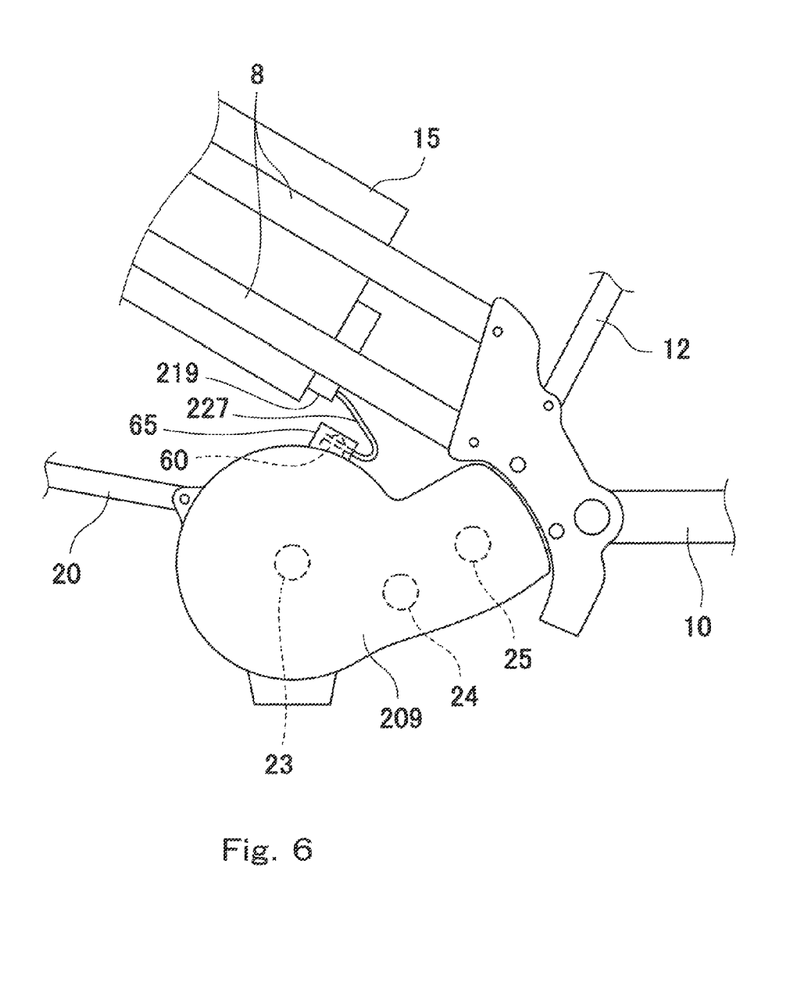
FIG. 6 is a left side view showing a region surrounding a motor unit case according to Modified example 3 of the embodiment of the present invention.

FIG. 6 is a left side view showing a region surrounding a motor unit case according to Modified example 3. As shown in FIG. 6, in Modified example 3, an inverter case 219 is placed above a motor unit case 209 and rearward relative to the battery case 15. In this case, a wiring member 227 is placed to extend through a space formed between the outer surface (outer rear surface in the illustrated example) of the inverter case 219 and the upper surface of the motor unit case 209. This layout of the cases 15, 209 and 219 and the wiring member 227 also makes it difficult for the user to access the wiring member 227 and makes it possible to effectively protect the wiring member 227 by the three cases 15, 209 and 219. Under this state, the inverter case 219 can be protected by the battery case 15 and the motor unit case 209. As shown in FIG. 6, the motor unit case 209 and the battery case 15 need not be directly connected to each other.

Figure 7:
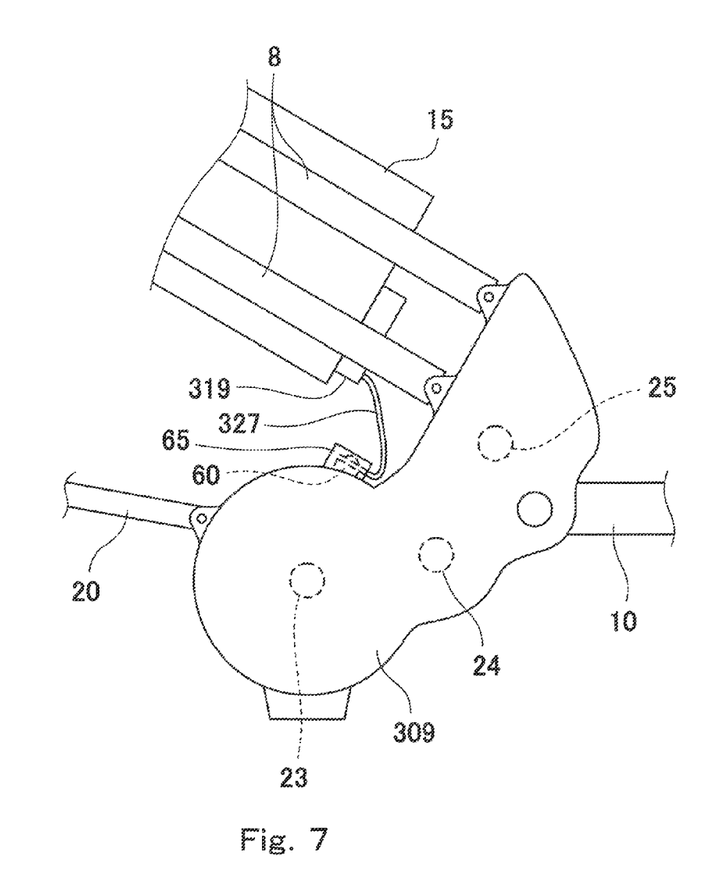
FIG. 7 is a left side view showing a region surrounding a motor unit case according to Modified example 4 of the embodiment of the present invention.

FIG. 7 is a left side view showing a region surrounding a motor unit case 309 according to Modified example 4. As shown in FIG. 7, in Modified example 3, an inverter case 319 is placed below the battery case 15, rearward relative to the battery case 15 and forward relative to the motor unit case 309. In this case, a wiring member 327 also may be placed in a space formed between the outer surface (outer rear surface in the illustrated example) of the inverter case 319 and the upper surface of the motor unit case 309. This layout of the cases 15, 309 and 319 and the wiring member 327 makes it difficult for the user to access the wiring member 327 and makes it possible to effectively protect the wiring member 327 by the three cases 15, 309 and 319.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

For example, at least one of the battery case and the motor unit case may be provided with a recessed portion or a convex portion to which the wiring member is guided and fitted. Or, the battery case or the motor unit case may be provided with a protruding portion covering a portion or entire of the wiring member, from outward in the vehicle width direction, in a location outward in the vehicle width direction relative to a location where the wiring member is placed. Or, the motor unit case may be provided with a support member for inhibiting the wiring member from being displaced due to its weight or a vibration. The substantially-V-shape need not be defined by the motor unit case, so long as the wiring member can be placed between the motor unit case and the battery case, and the motor unit case has a surface which faces the wall surface of the battery case. Moreover, the electric motor and the reduction mechanism may be provided as separate devices. In this case, it may be sufficient that one of the cases accommodating the electric motor and the case accommodating the reduction mechanism, and the battery case have a positional relationship between them for preventing the wiring member from being exposed.

Although the above described embodiment relates to protection of the wiring member connecting the inverter to the motor and prevention of access to the wiring member, similar configuration and layout may be applied to the wiring member connecting the battery to the inverter for the purpose of protecting the wiring member through which a high current flows and preventing the wiring member from being accessed.

INDUSTRIAL APPLICABILITY

The present invention has advantages that the user cannot easily access the wiring member and the wiring member can be protected effectively, and is effectively applicable to an electric motor which can achieve the advantages.

REFERENCE CHARACTERS LIST 1 electric motorcycle
3 front wheel
6 vehicle body frame
7 head pipe
8 main frame member
9 motor unit case
11 rear wheel
14 battery
15 battery case
18 inverter
19 inverter case
21 electric motor
22 reduction mechanism
23 motor shaft
24 input shaft
25 output shaft
26 space
27 wiring member
34 recessed portion
35 first facing portion
36 second facing portion
51 lower wall portion (first wall portion)
52 rear wall portion (second wall portion)
55 corner portion
60 terminal block

The invention claimed is:

1. An electric motorcycle comprising:
a battery for storing electric power;
an inverter for generating an AC current by the electric power supplied from the battery to the inverter;
a motor for generating driving power by the AC current generated by the inverter and supplied to the motor;
a wiring member for electrically connecting the inverter to the motor and flowing a current to drive the motor;
a battery case for accommodating the battery;
an inverter case for accommodating the inverter; and
a motor unit case for accommodating the motor,
wherein the wiring member is placed in a space defined by the battery case, the inverter case, and the motor unit case,
wherein the battery case has a corner portion defined by a first wall portion and a second wall portion,
wherein the corner portion is placed within a recessed portion formed above the motor unit case, the first wall portion faces a first facing portion of an outer surface of the motor unit case, the outer surface defining the recessed portion, and the second wall portion faces a second facing portion of the motor unit case, the second facing portion defining the recessed portion, and
wherein the space is defined by the first wall portion, the first facing portion and the inverter case.

2. The electric motorcycle according to claim 1,
wherein the battery case is placed between a front wheel and a rear wheel,
wherein the corner portion of the battery case is provided at a lower end portion of a rear portion of the battery case,
wherein the motor unit case accommodates the motor having a motor shaft and a reduction mechanism which receives a rotational power of the motor shaft from an input shaft, reduces a speed of the rotational power of the motor shaft, and outputs the rotational power from an output shaft,
wherein the output shaft is placed rearward relative to the corner portion,
wherein the motor shaft is placed forward relative to the output shaft, below the output shaft and forward relative to the corner portion,
wherein the first facing portion is provided between the motor shaft and the first wall portion, and wherein the second facing portion is provided between the output shaft and the second wall portion.

3. The electric motorcycle according to claim 1,
wherein the wiring member extends from the inverter to the motor through the space outside of the battery case, the inverter case and the motor unit case, and through the space between the first wall portion of the battery case and the first facing portion.

4. The electric motor according to claim 1, comprising:
a head pipe; and
a main frame extending substantially rearward from the head pipe,
wherein the battery case is mounted to the main frame to extend along a direction in which the main frame extends, and
wherein the motor unit case has a coupling portion for coupling the motor unit case to a rear end portion of the main frame, and the coupling portion is provided on the second facing portion.

5. The electric motorcycle according to claim 1,
wherein the inverter case is placed above the motor unit case and rearward relative to the battery case.

6. An electric motorcycle comprising:
a battery for storing electric power;
an inverter for generating an AC current by the electric power supplied from the battery to the inverter;
a motor for generating driving power by the AC current generated by the inverter and supplied to the motor;
a wiring member for electrically connecting the inverter to the motor and flowing a current to drive the motor;
a battery case for accommodating the battery;
an inverter case for accommodating the inverter; and
a motor unit case for accommodating the motor,
wherein the wiring member is placed in a space defined by the battery case, the inverter case, and the motor unit case,
wherein a terminal connected to the wiring member is attached on an outer surface of the motor unit case which defines the space, and
wherein the terminal is provided on an inner portion of the motor unit case in a vehicle width direction.

7. The electric motorcycle according to claim 6,
wherein the inverter case is placed above the motor unit case and rearward relative to the battery case.

8. An electric motorcycle comprising:
a battery for storing electric power;
an inverter for generating an AC current by the electric power supplied from the battery to the inverter;
a motor for generating driving power by the AC current generated by the inverter and supplied to the motor;
a wiring member for electrically connecting the inverter to the motor and flowing a current to drive the motor;
a battery case for accommodating the battery;
an inverter case for accommodating the inverter; and
a motor unit case for accommodating the motor,
wherein the wiring member is placed in a space defined by the battery case, the inverter case, and the motor unit case,
wherein the inverter case is mounted to a lower surface of the battery case, and placed forward relative to the motor unit case.

9. The electric motorcycle according to claim 8,
wherein the motor unit case is placed rearward relative to the battery case, and the inverter case is placed forward relative to the motor unit case and below the battery case, and
wherein the space is covered with at least one of the motor unit case, the battery case and the inverter case when the space is viewed from front of the inverter case and from rear of the motor unit case.

* * * * *